United States Patent
Suzuki et al.

(10) Patent No.: US 9,108,241 B2
(45) Date of Patent: Aug. 18, 2015

(54) METHOD FOR MANUFACTURING ROD-LIKE COMPONENT

(71) Applicant: KOMATSU NTC LTD., Toyama (JP)

(72) Inventors: Takeshi Suzuki, Komatsu (JP); Jun Kuwayama, Kaga (JP)

(73) Assignee: KOMATSU NTC LTD., Toyama (JP)

( * ) Notice: Subject to any disclaimer, the term of this patent is extended or adjusted under 35 U.S.C. 154(b) by 0 days.

(21) Appl. No.: 14/398,207

(22) PCT Filed: Apr. 22, 2013

(86) PCT No.: PCT/JP2013/061756
§ 371 (c)(1),
(2) Date: Oct. 31, 2014

(87) PCT Pub. No.: WO2013/179812
PCT Pub. Date: Dec. 5, 2013

(65) Prior Publication Data
US 2015/0121696 A1    May 7, 2015

(30) Foreign Application Priority Data

May 30, 2012    (JP) .................................. 2012-123340

(51) Int. Cl.
*B23P 17/00*    (2006.01)
*B21K 1/08*    (2006.01)
*B23B 31/16*    (2006.01)
*B23D 37/00*    (2006.01)
(Continued)

(52) U.S. Cl.
CPC ... *B21K 1/08* (2013.01); *B23B 5/18* (2013.01); *B23B 31/02* (2013.01); *B23B 31/16291* (2013.01); *B23D 37/005* (2013.01); *B21K 1/06* (2013.01); *B23C 3/06* (2013.01); *B23P 2700/07* (2013.01); *F16C 3/06* (2013.01); *Y10T 29/17* (2015.01); *Y10T 29/49286* (2015.01)

(58) Field of Classification Search
CPC .. B21K 1/08; B23D 37/005; B23B 31/16291; F16C 3/06; Y10T 29/49286; Y10T 29/17
See application file for complete search history.

(56) References Cited

U.S. PATENT DOCUMENTS

| | | | |
|---|---|---|---|
| 5,025,689 A * | 6/1991 | Mayer | 82/106 |
| 5,230,265 A * | 7/1993 | Schmid | 82/106 |

(Continued)

FOREIGN PATENT DOCUMENTS

| | | |
|---|---|---|
| JP | 2-9501 A | 1/1990 |
| JP | 7-68402 A | 3/1995 |

(Continued)

OTHER PUBLICATIONS

The International Search Report for the corresponding international application No. PCT/JP2013/061756, issued on May 21, 2013.

*Primary Examiner* — Ryan J Walters
(74) *Attorney, Agent, or Firm* — Global IP Counselors, LLP

(57) ABSTRACT

A method for manufacturing a crankshaft with a turning and broaching machine is provided with a temporary setting process, a lifting process, a centering process, and a clamping process. An unprocessed crankshaft is mounted on first and second temporary settings in the temporary setting process. A rear flange is lifted by a first chuck jaws and a front flange is lifted by a second chuck jaws in the lifting process. First and second centers are inserted into first and second center holes in the centering process.

2 Claims, 7 Drawing Sheets

(51) Int. Cl.
  *B23B 5/18* (2006.01)
  *B23B 31/02* (2006.01)
  *F16C 3/06* (2006.01)
  *B21K 1/06* (2006.01)
  *B23C 3/06* (2006.01)

(56) References Cited

U.S. PATENT DOCUMENTS 5,622,092 A * 4/1997 Gleason ............... 82/106
6,161,991 A * 12/2000 Kumazawa et al. ......... 409/132
7,424,776 B2 * 9/2008 Shoji et al. ................. 29/888.08
2007/0231096 A1 10/2007 Shoji et al.
2013/0087024 A1 4/2013 Shoji et al.

FOREIGN PATENT DOCUMENTS

| | | | |
|---|---|---|---|
| JP | 2000-246503 A | 9/2000 |
| JP | 2007-245282 A | 9/2007 |
| JP | 2012-6102 A | 1/2012 |

* cited by examiner

METHOD FOR MANUFACTURING ROD-LIKE COMPONENT

CROSS-REFERENCE TO RELATED APPLICATIONS

This application is a U.S. National stage application of International Application No. PCT/JP2013/061756, filed on Apr. 22, 2013. This U.S. National stage application claims priority under 35 U.S.C. §119(a) to Japanese Patent Application No. 2012-123340, filed in Japan on May 30, 2012, the entire contents of which are hereby incorporated herein by reference.

BACKGROUND

Field of the Invention

The present invention relates to a method for manufacturing a rod-like component by machining a rod-like workpiece.

Background Information A machine tool is conventionally known that is provided with two chuck devices having a center and chuck jaws for effectively machining a forging or forged rod-like workpiece (for example, an unprocessed crankshaft) (see, for example, Japanese Patent Laid-open No. 2007-245282).

A workpiece with center holes formed in either end surface is loaded onto the machine tool described in Japanese Patent Laid-open No. 2007-245282, and a centering process, a temporary setting part forming process, and a finishing process are carried out in sequence. Centers are inserted into the center holes in the centering process. The external peripheral surface of both end parts of the workpiece are turned in the temporary setting part forming process. The surface of the workpiece is turned while being held by the chuck jaws at both end parts of the workpiece in the finishing process.

SUMMARY

Generally in this case, when the workpiece is loaded into the machine tool, the centering process is carried out after the workpiece is mounted once on the temporary setting of the chuck device. However in this type of machine tool, a workpiece in which the aforementioned temporary setting part is partly formed or has already been formed may be loaded onto the temporary setting. In this case, because the outer diameter of a temporary setting part among the temporary setting parts of the workpiece is smaller than the outer diameter before machining, the center holes may be positioned lower than the corresponding centers. Therefore, when the centers are subsequently inserted, the centers come up against the two end surfaces of the workpiece and the centers cannot be inserted into the center holes. As a result, there is a problem that the machine tool may be stopped due to an abnormality.

When a workpiece in which the temporary setting part is partly machined or completely machined is loaded on the temporary setting, the machine tool may be stopped once for example without the workpiece in which the finishing process has been completed being discharged and then the operation may be resumed, or the machine tool may be stopped once for a particular reason while the temporary setting is being formed, while the workpiece is being transferred from the temporary setting part forming process to the finishing process, or while undergoing the finishing process, and then the operation may be resumed.

In consideration of the above conditions, an object of the present invention is to provide a method for manufacturing a rod-like component in which the external peripheral surface of a temporary setting part of a workpiece can be machined and centering can be easily performed in a temporary setting part forming process.

A method for manufacturing a rod-like component according to a first exemplary embodiment involves a rod-like workpiece being machined by a machine tool equipped with a first chuck device having a first temporary setting, and a first center and a first chuck jaws disposed higher than the first temporary setting, and a second chuck device having a second temporary setting facing the first temporary setting, a second center facing the first center, and a second chuck jaws. The method for manufacturing the rod-like component includes a temporary setting process, a lifting process, a centering process, and a clamping process. The temporary setting process involves mounting a first temporary setting part of the workpiece on the first temporary setting and mounting a second temporary setting part of the workpiece on the second temporary setting. The lifting process involves lifting the first temporary setting part with the first chuck jaws. The centering process involves inserting the first center into a first center hole formed in a first end surface of the first temporary setting part and inserting the second center into a second center hole formed in a second end surface of the second temporary setting part. The clamping process involves clamping the first temporary setting part with the first chuck jaws and clamping the second temporary setting part with the second chuck jaws.

According to the method for manufacturing a rod-like component according to the first exemplary embodiment, when the workpiece is mounted on the temporary setting of the first chuck device, even when the external peripheral surface of the temporary setting part of the first temporary setting part of the workpiece is machined, the first center can be smoothly inserted into the first center hole and centering can be performed easily because the workpiece can be lifted up by the first chuck jaws in the lifting process.

The method for manufacturing a rod-like component according to a second exemplary embodiment is related to the first exemplary embodiment, and the lifting process involves lifting the second temporary setting part with the second chuck jaws.

According to the method for manufacturing a rod-like component according to the second exemplary embodiment, even when the external peripheral surface of the second temporary setting part has been machined in addition to the first temporary setting part, the second center can be inserted smoothly into the second center hole and centering can be performed easily since the workpiece can be lifted by the second chuck jaws in the lifting process.

The present invention as described above is able to provide a workpiece machining method in which centering can be easily performed in a temporary setting part forming process even with a workpiece in which the external peripheral surface of a temporary setting part has been machined.

DESCRIPTION OF EXEMPLARY EMBODIMENTS

Overall Configuration of Turning and Broaching Machine 1

Figure 1:
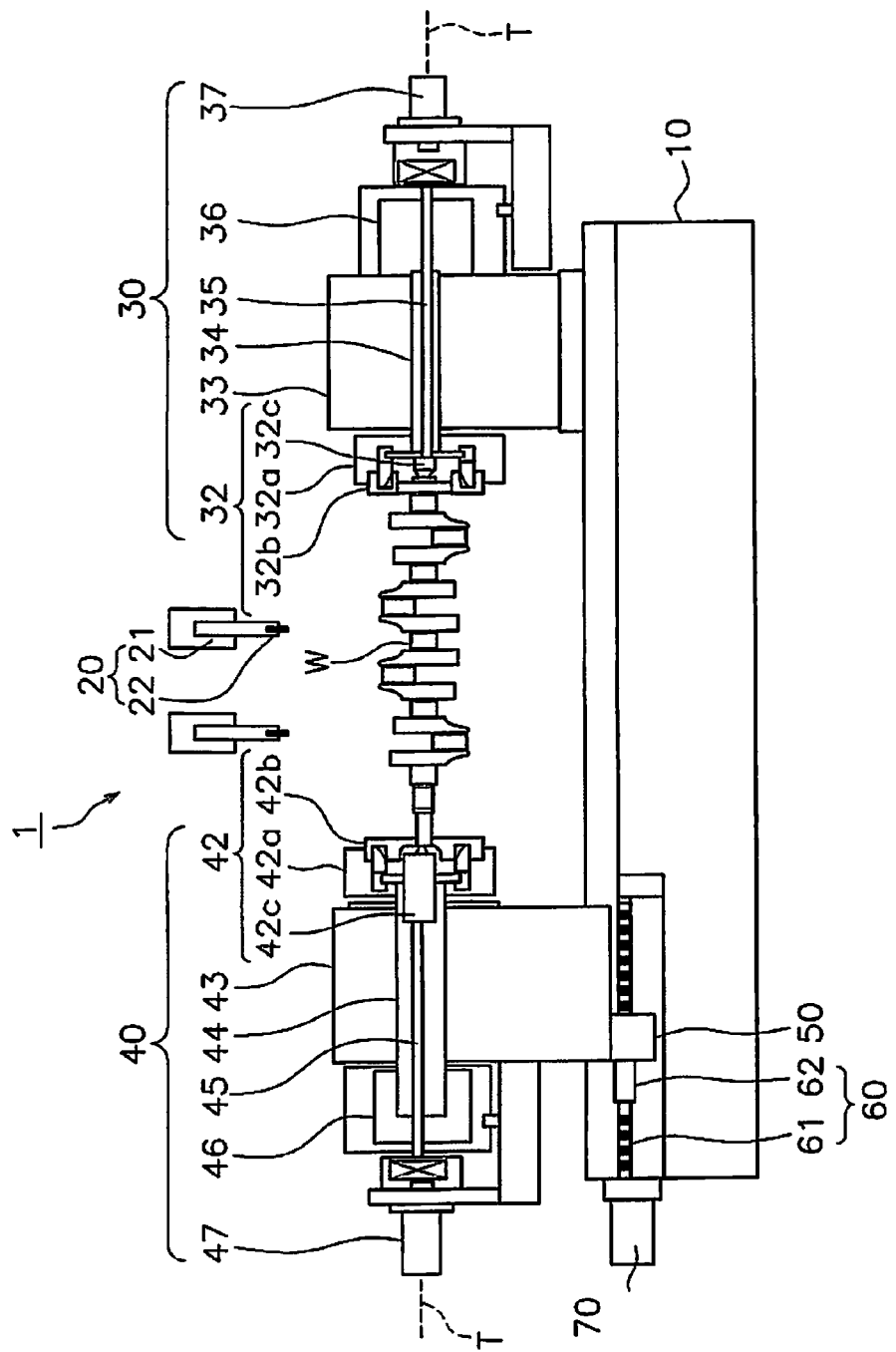
FIG. 1 is a cross-sectional view illustrating a configuration of a turning and broaching machine as an example of a machine tool according to an exemplary embodiment of the present invention.
Figure 2:
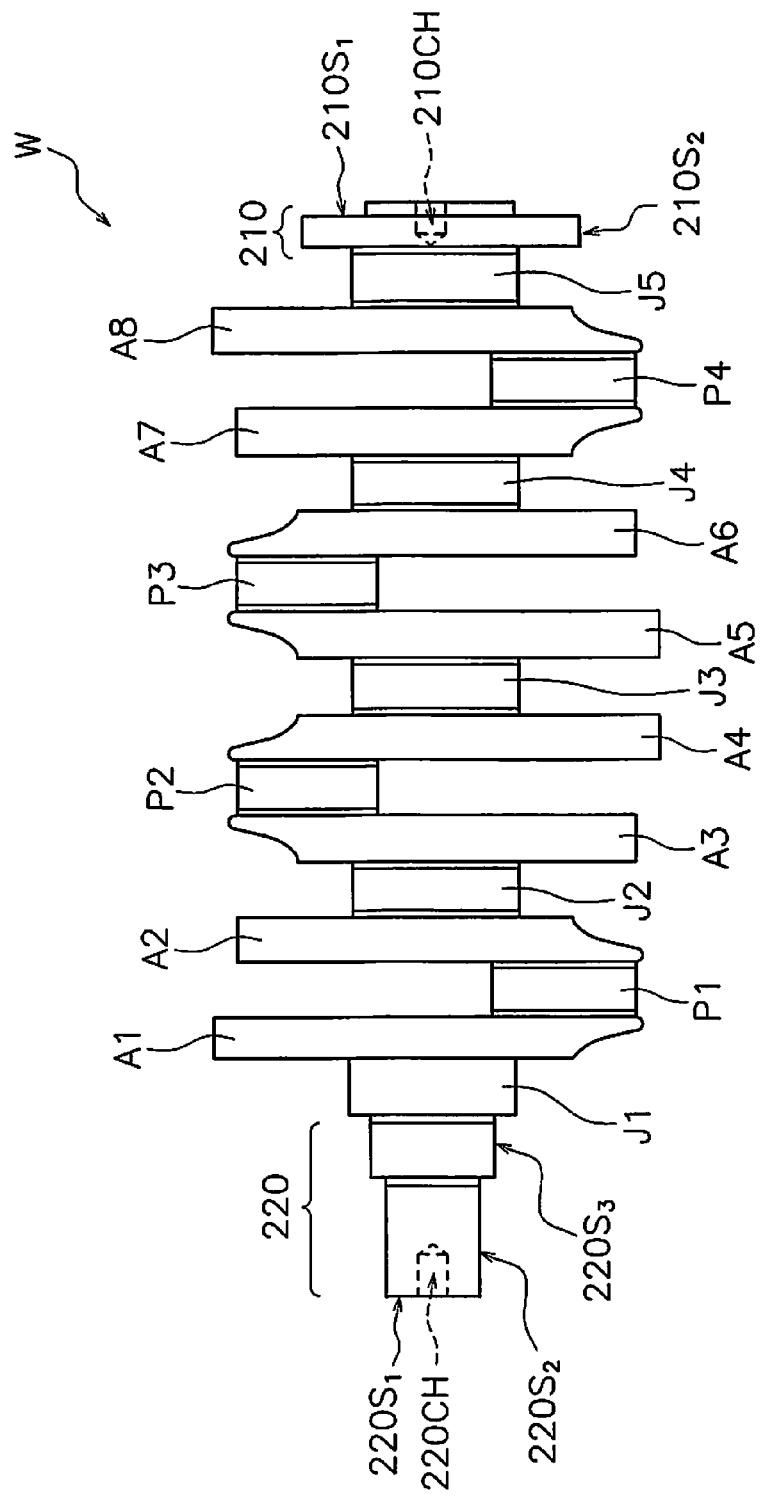
FIG. 2 is a side view of a configuration of an unprocessed crankshaft.

An explanation will be provided herein of the overall configuration of a turning and broaching machine 1 with reference to the drawings. FIG. 1 is a cross-sectional view illustrating a configuration of the turning and broaching machine 1 (example of a machine tool) according to an exemplary embodiment. FIG. 2 is a side view illustrating a configuration of an unprocessed crankshaft W (example of a rod-like workpiece) according to an exemplary embodiment.

The turning and broaching machine 1 is a lathe for manufacturing a crankshaft (example of a rod-like component) by turning the unprocessed crankshaft W.

The unprocessed crankshaft W is forged or formed in a rod-like manner by forging, and has a profile larger than the crankshaft to account for a turning margin. The unprocessed crankshaft W has a shaft center that is bent as illustrated in FIG. 2. The unprocessed crankshaft W has first to fifth main journals J1 to J5, first to fourth pin journals P1 to P4, first to eighth crank arms A1 to A8, a rear flange 210 (example of a first temporary setting part), and a front shaft 220 (example of a second temporary setting part). The rear flange 210 has a first end surface $210S_1$, a first external peripheral surface $210S_2$ (combined from the external peripheral surfaces of the temporary setting part and a clamping part), and a first center hole 210CH formed in the first end surface $210S_1$. The front flange 220 has a second end surface $220S_1$, a second external peripheral surface $220S_2$ (external peripheral surface of the temporary setting part), a third external peripheral surface $220S_3$ (external peripheral surface of a clamping part), and a second center hole 220CH formed in the second end surface $220S_1$.

The turning and broaching machine 1 is equipped with a base 10, an implement 20, a first work head 30, a second work head 40, a slider 50, a ball screw 60, and a servomotor 70 as illustrated in FIG. 1.

The base 10 supports the implement 20, the first work head 30, and the second work head 40 and the like.

The implement 20 has a tool head 21 and a tool 22. The tool head 21 is supported on the base 10 in a moveable manner. The tool 22 is attached to the tool head 21.

The first work head 30 has a first chuck device 32, a fixing base 33, a first main shaft 34, a first plunger 35, a first rotating cylinder 36, and a first center cylinder 37.

The first chuck device 32 is fixed to the fixing base 33. The first chuck device 32 clamps the rear flange 210 of the unprocessed crankshaft W. The first chuck device 32 has a first body part 32a, three first chuck jaws 32b, and a first center 32c. The first body part 32a is fixed to an end part of the first main shaft 34. The three first chuck jaws 32b are moveably attached to the first body part 32a in the radial direction of a shaft line T of the first main shaft 34. The three first chuck jaws 32b are able to clamp the first external peripheral surface $210S_2$ of the rear flange 210 with a predetermined clamping force (for example, approximately 30000 N). The first center 32c is moveably disposed in the first body part 32a along the shaft line T. The first center 32c is fixed to an end part of the first plunger 35. The first center 32c is moved toward the second work head 40 and inserted into the first center hole 210CH of the unprocessed crankshaft W when the unprocessed crankshaft W is loaded by a workpiece loader which is not illustrated. The configuration of the first chuck device 32 is described below.

The first main shaft 34 is inserted into the fixing base 33 along the shaft line T. The first main shaft 34 is supported in the fixing base 33 in a manner that allows rotation around the shaft line T. The first plunger 35 is inserted into the first main shaft 34 along the shaft line T. The first plunger 35 is supported in the first main shaft 34 in a manner that allows sliding along the shaft line T. The first rotating cylinder 36 rotates the first main shaft 34 around the shaft line T. Consequently, the first chuck device 32 rotates around the shaft line T. The first center cylinder 37 causes the first center 32c to move along the shaft line T due to the first plunger 35 sliding along the shaft line T.

The second work head 40 is disposed to face the first work head 30. The second work head 40 is able to move in a direction parallel to the shaft line T. The second work head 40 has a second chuck device 42, a movable base 43, a second primary shaft 44, a second plunger 45, a second rotating cylinder 46, and a second center cylinder 47. Explanations regarding the constituent elements that are the same as those of the first work head 30 will be omitted hereinbelow.

The second chuck device 42 clamps the third external peripheral surface $220S_3$ of the front shaft 220 of the unprocessed crankshaft W. The second chuck device 42 has a second body part 42a, a plurality of second chuck jaws 42b, and a second center 42c. The plurality of second chuck jaws 42b clamp the front shaft 220 with a predetermined clamping force (e.g., 30000 N). A detailed configuration of the second chuck device 42 is provided below.

The movable base 43 is fixed to the slider 50. The slider 50 is attached to the ball screw 60 in a manner that allows sliding along the shaft line T. The ball screw 60 has a screw shaft 61 and a nut 62 screwed onto the screw shaft 61. The servomotor 70 rotates the screw shaft 61.

First Chuck Device 32

Figure 3:
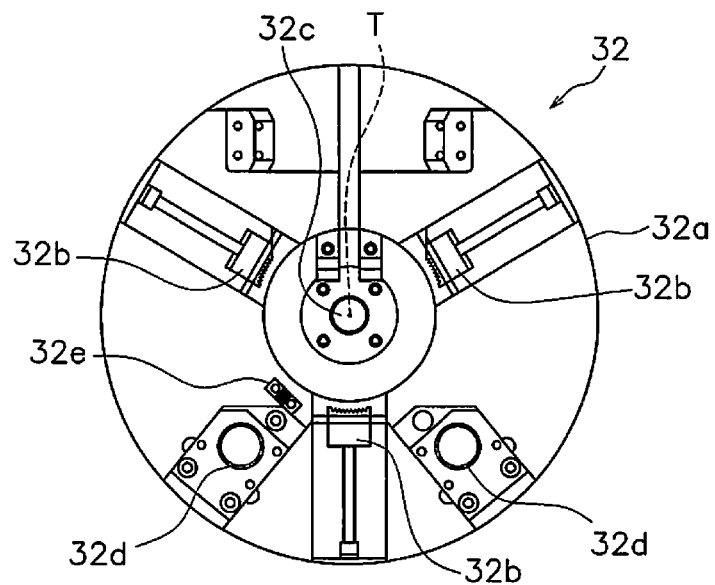
FIG. 3 is a plan view of a first chuck device.

FIG. 3 is a plan view of the first chuck device 32 as seen from the second chuck device 42 side.

The first chuck device 32 has a pair of first temporary settings 32d and a longitudinal datum setting 32e in addition to the first body part 32a, the three first chuck jaws 32b, and the first center 32c as illustrated in FIG. 3.

The three first chuck jaws 32b are disposed uniformly in the circumferential direction of a shaft center T. The three first chuck jaws 32b operate interconnectedly in the radial direction of the shaft center T. FIG. 3 depicts a state in which the first chuck jaws 32b are advanced the furthest to the inside.

The pair of first temporary settings 32d are disposed lower than the first center 32c, that is, near the base 10. The pair of first temporary settings 32d are symmetrically disposed on the right and left relative to the shaft center T. The rear flange 210 of the unprocessed crankshaft W is temporarily mounted on the pair of first temporary settings 32d. At this time, the first external peripheral surface $210S_2$ of the rear flange 210 is brought into contact with the pair of first temporary settings 32d.

The longitudinal datum setting 32e is disposed lower than the first center 32c and higher than the pair of first temporary settings 32d. The longitudinal datum setting 32e is brought into contact with the first end surface 210S₁ of the rear flange 210 of the unprocessed crankshaft W for example. The longitudinal datum setting 32e is a member for defining a machining datum of the unprocessed crankshaft W in the longitudinal direction.

Although not illustrated, the first chuck device 32 is also able to use the first center 32c for clamping.

Second Chuck Device 42

Figure 4:
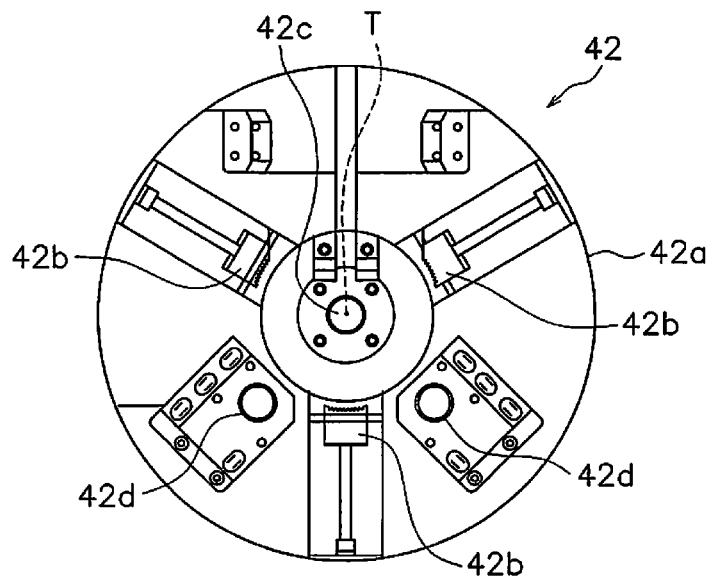
FIG. 4 is a plan view of a second chuck device.

FIG. 4 is a plan view of the second chuck device 42 as seen from the first chuck device 32 side.

The second chuck device 42 has a pair of second temporary settings 42d in addition to the aforementioned second body part 42a, the three second chuck jaws 42b, and the second center 42c as illustrated in FIG. 4.

The three second chuck jaws 42b are disposed uniformly in the circumferential direction of the shaft center T. The three second chuck jaws 42b operate interconnectedly in the radial direction of the shaft center T. FIG. 4 depicts a state in which the second chuck jaws 42b are advanced the furthest to the inside.

The pair of second temporary settings 42d are disposed lower than the second center 42c, that is, near the base 10. The pair of second temporary settings 42d are symmetrically disposed on the right and left relative to the shaft center T. The front shaft 220 of the unprocessed crankshaft W is temporarily mounted on the pair of second temporary settings 42d. At this time, the second external peripheral surface 220S₂ of the front shaft 220 is brought into contact with the pair of second temporary settings 42d.

Although not illustrated, the second chuck device 42 is also able to use the second center 42c for clamping.

Functions of Turning and Broaching Machine 1

Figure 5:
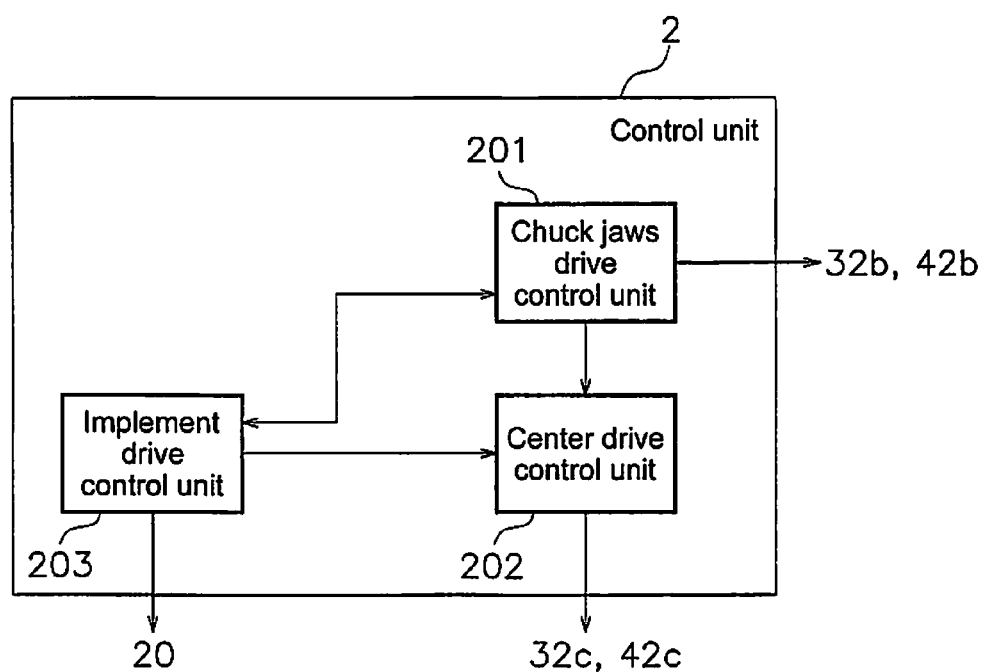
FIG. 5 is a functional block diagram of the turning and broaching machine.
Figure 6:
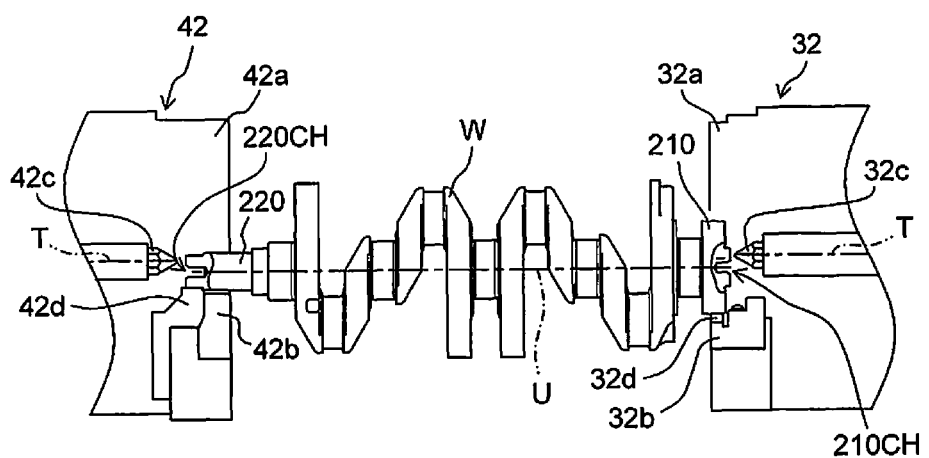
FIG. 6 is a view for explaining a mounting state of an unprocessed crankshaft in which first and second center holes of the crankshaft are positioned lower than the first and second centers of the first and second chuck devices.
Figure 7:
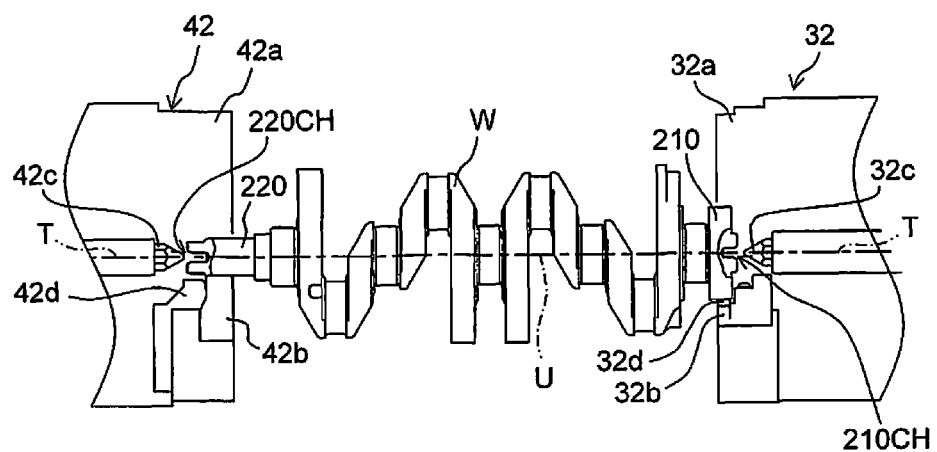
FIG. 7 is a view for explaining a mounting state of an unprocessed crankshaft in which the first and second center holes of the crankshaft are positioned at the same height as the first and second centers of the first and second chuck devices.
Figure 8:
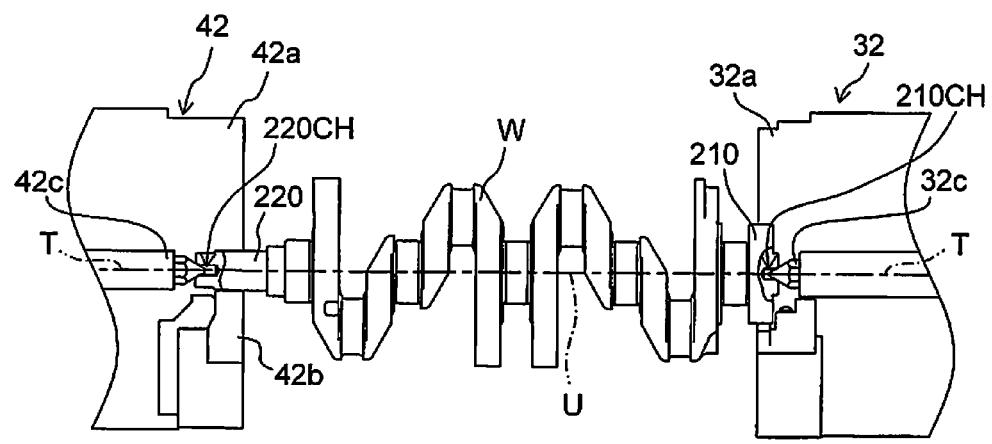
FIG. 8 is a view for explaining a mounting state of an unprocessed crankshaft in which the crankshaft is centered.

An explanation will be provided herein of the functions of the turning and broaching machine 1 with reference to the drawings. FIG. 5 is a block diagram of functions of the turning and broaching machine 1 (control unit 2). FIGS. 6 to 8 are diagrams for explaining the mounting state of the unprocessed crankshaft W.

The control unit 2 has a chuck jaws drive control unit 201, a center drive control unit 202, and an implement drive control unit 203.

While an un-machined unprocessed crankshaft W is mounted on the first and second temporary settings 32d and 42d during a normal operation, the present exemplary embodiment assumes a case in which the unprocessed crankshaft W is loaded in a state in which the first external peripheral surface 210S₂ of the rear flange 210 and the second external peripheral surface 220S₂ of the front shaft 220 are machined (that is, the temporary setting parts are partially or completely formed). The reason for the case in which the unprocessed crankshaft W is mounted with the temporary setting parts being partially or completely formed may include a case in which the turning and broaching machine 1 is stopped once (that is, the power is turned off) without the crankshaft which has undergone the finishing process being unloaded and thereafter the operation is resumed (that is, the power is turned on), or a case in which the turning and broaching machine 1 is stopped once for a particular reason during the temporary setting forming process, while switching from the temporary setting part forming process to the finishing process, or during the finishing process, and thereafter the operation is resumed.

In such a case, the first external peripheral surface 210S₂ of the rear flange 210 and the second external peripheral surface 220S₂ of the front shaft 220 on the unprocessed crankshaft W are one size thinner due to turning during the temporary setting part forming process. As a result, the first and second center holes 210CH and 220CH of the unprocessed crankshaft W mounted on the first and second temporary settings 32d and 42d are positioned lower than the first and second centers 32c and 42c as illustrated in FIG. 6. Thus, under this condition, the first and second centers 32c and 42c cannot be smoothly inserted into the first and second center holes 210CH and 220CH even when centering is performed with the first and second centers 32c and 42c.

The chuck jaws drive control unit 201 drives the first chuck jaws 32b toward the inside in the radial direction to lift the rear flange 210 up to a predetermined position, and drives the second chuck jaws 42b toward the inside in the radial direction to lift the front flange 220 up to a predetermined position. As a result, the unprocessed crankshaft W is lifted up from the first and second temporary settings 32d and 42d so that the first and second center holes 210CH and 220CH approach the height of the first and second centers 32c and 42c as illustrated in FIG. 7. Thus, under this condition, the first and second centers 32c and 42c can be smoothly inserted into the first and second center holes 210CH and 220CH when centering is performed with the first and second centers 32c and 42c.

The chuck jaws drive control unit 201 notifies the center drive control unit 202 about the fact that the unprocessed crankshaft W has been lifted up to the predetermined position with the first and second chuck jaws 32b and 42b. The unprocessed crankshaft W may be lifted up to a height that enables the insertion of the first and second centers 32c and 42c into the first and second center holes 210CH and 220CH. When the unprocessed crankshaft W is lifted up by the first and second chuck jaws 32b and 42b at this time, a shaft center U of the unprocessed crankshaft W is positioned lower than the shaft center T of the first and second centers 32c and 42c, as shown in FIG. 6.

When notified by the chuck jaws drive control unit 201 that the unprocessed crankshaft W has been lifted, the center drive control unit 202 inserts the first and second centers 32c and 42c into the first and second center holes 210CH and 220CH. As a result, the centering of the unprocessed crankshaft W is completed as illustrated in FIG. 8. Because the unprocessed crankshaft W may be lifted up to the predetermined height as described above, the first and second centers 32c and 42c can be inserted smoothly into the first and second center holes 210CH and 220CH.

Moreover, normal turning is performed on the unprocessed crankshaft W while the chuck jaws drive control unit 201 controls the first chuck jaws 32b to clamp the first center 32c with a predetermined clamping force (e.g., approximately 30000 N) and controls the second chuck jaws 42b to clamp the front shaft 220 with a predetermined clamping force (e.g., approximately 30000 N) when the centering of the unprocessed crankshaft W by the first and second centers 32c and 42c is completed.

The implement drive control unit 203 controls the implement 20 to machine the first external peripheral surface 210S₂ of the rear flange 210 when notified by the chuck jaws drive control unit 201 that the first center 32c and the front shaft 220 are clamped during the temporary setting part forming process. Moreover, the implement drive control unit 203 controls the implement 20 to machine the second external peripheral surface 220S₂ and the third external peripheral surface 220S₃ of the front shaft 220 when notified by the chuck jaws drive control unit 201 that the rear flange 210 and the second center 42c are clamped in a centered state. During the subsequent finishing process, the implement drive control unit 203 controls the implement 20 to machine the unprocessed crankshaft W (specifically, the journals and the like) when notified by the chuck jaws drive control unit 201 that the rear flange 210 and the front shaft 220 are clamped. The implement drive control unit 203 then notifies the chuck jaws drive control unit 201 and the center drive control unit 202 that the machining of the unprocessed crankshaft W is completed.

Operations of Turning and Broaching Machine 1

Figure 9:
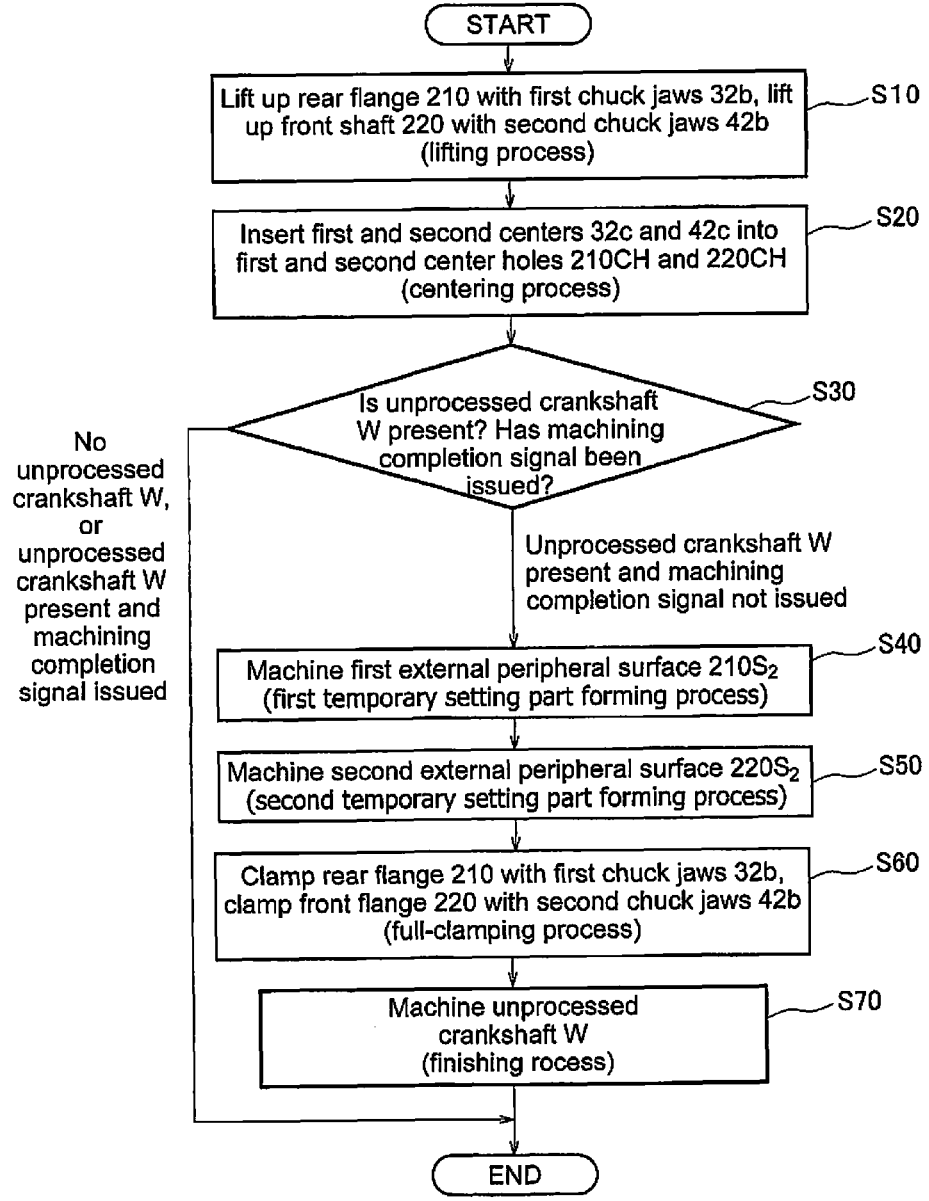
FIG. 9 is a flowchart illustrating operation of the turning and broaching machine.

An explanation will be provided herein of the operations of the turning and broaching machine 1 with reference to the drawings. FIG. 9 is a diagram for explaining operations of the turning and broaching machine.

When the unprocessed crankshaft W is mounted on the first and second temporary settings 32d and 42d in the temporary setting process, first the turning and broaching machine 1 lifts up the rear flange 210 with the first chuck jaws 32b and lifts up the front shaft 220 with the second chuck jaws 42b in step S10 (lifting process). Consequently, the unprocessed crankshaft W is lifted up to a height that enables the insertion of the first and second centers 32c and 42c into the first and second center holes 210CH and 220CH (see FIG. 7).

Next, the turning and broaching machine 1 inserts the first and second centers 32c and 42c into the first and second center holes 210CH and 220CH in step S20 (centering process). As a result, the unprocessed crankshaft W is centered (see FIG. 8).

The turning and broaching machine 1 then determines in step S30 the presence of the unprocessed crankshaft W on the first and second temporary settings 32d and 42d, and determines if an unprocessed crankshaft W machining completion signal has been issued. If the unprocessed crankshaft W is present but the machining completion signal has not issued, the processing moves to step S40. Conversely, if the unprocessed crankshaft W is present and the machining completion signal has been issued, or if the unprocessed crankshaft W is not present, the processing is finished. The presence of the unprocessed crankshaft W may be discerned on the basis of the movement distance of the first and second centers 32c and 42c.

The turning and broaching machine 1 then clamps the first center 32c in the first chuck device 32 with the predetermined clamping force and machines the first external peripheral surface $210S_2$ while clamping the front shaft 220 with the second chuck jaws 42b with the predetermined clamping force in step S40 (first temporary setting part forming process).

The turning and broaching machine 1 then clamps the rear flange 210 in the first chuck device 32 with the predetermined clamping force and machines the second external peripheral surface $220S_2$ and the third external peripheral surface $220S_3$ while clamping the second center 42c in the second chuck device 42 with the predetermined clamping force in step S50 (second temporary setting part forming process).

The turning and broaching machine 1 then clamps the rear flange 210 in the first chuck device 32 with the predetermined clamping force and clamps the front shaft 220 in the second chuck device 42 with the predetermined clamping force in step S60 (full-clamping process).

The turning and broaching machine 1 then performs turning on the entire surface of the unprocessed crankshaft W in step S70 (finishing process).

Actions and Effects

The method for manufacturing a rod-like component based on machining the unprocessed crankshaft W (example of a rod-like workpiece) with the turning and broaching machine 1 includes the temporary setting process in which the loaded unprocessed crankshaft W is mounted on the first and second temporary settings 32d and 42d, the lifting process in which the rear flange 210 is lifted with the first chuck jaws 32b and the front shaft 220 is lifted with the second chuck jaws 42b, and the centering process in which the first and second centers 32c and 42c are inserted into the first and second center holes 210CH and 220CH.

Therefore, even when the external peripheral surfaces of the temporary setting parts of the unprocessed crankshaft W have been machined in the temporary setting part forming process, the first and second centers 32c and 42c can be respectively inserted smoothly into the first and second center holes 210CH and 220CH due to the unprocessed crankshaft W being lifted with the first and second chuck jaws 32b and 42b.

Other Exemplary Embodiments

The present invention is not limited to the above exemplary embodiments and various changes and modifications may be made without departing from the spirit of the invention.

While the unprocessed crankshaft W is lifted by the first and second chuck jaws 32b and 42b in the lifting process in the above exemplary embodiment, the present invention is not limited as such. When only one of the temporary setting parts is machined in the lifting process, the unprocessed crankshaft W may be lifted at only one of the temporary setting part sides that had been machined by either of the first and second chuck jaws 32b and 42b.

While the unprocessed crankshaft W is transferred between the first and second chuck jaws 32b and 42b in accordance with the machining process in the above exemplary embodiment, the present invention is not limited as such. The transferring the clamping of the unprocessed crankshaft W between the first and second chuck jaws 32b and 42b may be changed as appropriate based on the order of the machining process.

While not mentioned in particular in the above exemplary embodiment, the lifting process may be executed only during the start-up of the turning and broaching machine 1. That is, the lifting process may not be executed during normal continuous operation after the start-up of the turning and broaching machine 1. In this case, a suppression in the occurrence of abnormality stops during start-up which are possible when mounting the unprocessed crankshaft W in which the temporary setting forming is completed, and a reduction in the lead time during normal continuous operation when an un-machined unprocessed crankshaft W is loaded, are made possible.

The present invention is not limited to the turning and broaching machine described in the above exemplary embodiment, and may also be applicable to a crankshaft milling machine, for example.

What is claimed is:

1. A method for manufacturing a rod-like component by machining a rod-like workpiece with a machine tool equipped with a first chuck device and a second chuck device, the first chuck device having a first temporary setting, a first center disposed higher than the first temporary setting, and a first chuck jaws, the second chuck device having a second temporary setting facing the first temporary setting, a second center facing the first center, and a second chuck jaws, the method comprising:

a temporary setting process for mounting a first temporary setting part of the workpiece on the first temporary setting and mounting a second temporary setting part of the workpiece on the second temporary setting;

a lifting process for lifting the first temporary setting part with the first chuck jaws;

a centering process for inserting the first center into a first center hole formed in a first end surface of the first temporary setting part and inserting the second center into a second center hole formed in a second end surface of the second temporary setting part; and a clamping process for clamping the first temporary setting part with the first chuck jaws and clamping the second temporary setting part with the second chuck jaws.

2. The method for manufacturing the rod-like component according to claim 1, wherein the second temporary setting part is lifted by the second chuck jaws in the lifting process.

* * * * *